United States Patent [19]
Priem

[11] Patent Number: 5,680,592
[45] Date of Patent: Oct. 21, 1997

[54] SYSTEM USING A PLURALITY OF STATE MACHINES FOR TRANSLATING COMMANDS INTENDED FOR LEGACY BUS DEVICES TO COMMANDS FOR LOCAL BUS DEVICES

[75] Inventor: Curtis Priem, Fremont, Calif.

[73] Assignee: Nvidia Corporation, Sunnyvale, Calif.

[21] Appl. No.: 422,998

[22] Filed: Apr. 14, 1995

[51] Int. Cl.⁶ .................................................. G06F 13/00
[52] U.S. Cl. .......................... 395/527; 395/309; 395/500; 395/823; 395/825
[58] Field of Search .................................. 395/281, 309, 395/500, 750, 527, 823, 825

[56] References Cited

U.S. PATENT DOCUMENTS

| | | | |
|---|---|---|---|
| 4,727,480 | 2/1988 | Albright et al. | 395/500 |
| 5,309,568 | 5/1994 | Ghosh et al. | 395/309 |
| 5,414,831 | 5/1995 | Wilson et al. | 395/500 |
| 5,426,739 | 6/1995 | Lin et al. | 395/309 |
| 5,454,081 | 9/1995 | Thome | 395/281 |
| 5,515,525 | 5/1996 | Grynberg et al. | 395/500 |
| 5,517,650 | 5/1996 | Bland et al. | 395/750 |

OTHER PUBLICATIONS

"Emulation of IBM Pc Bus Operations by an 80188 Processor", IBM Technical Disclosure Bulletin, v. 31, n. 10, pp. 126–129 Mar. 1989.

*Primary Examiner*—Thomas C. Lee
*Assistant Examiner*—Po C. Huang
*Attorney, Agent, or Firm*—Stephen L. King

[57] ABSTRACT

Apparatus for emulating input/output devices on an ISA bus using input/output devices on a local bus which includes circuitry for snooping on the bus to capture commands sent to input/output devices the functions of which are to be emulated, circuitry for storing those commands, circuitry for generating new commands in response to the commands which are stored, and circuitry for generating output signals in response to the new commands which output signals replace the output signals produced by the input/output devices on an ISA bus.

16 Claims, 6 Drawing Sheets

Sound Circuit Register Space

| I/O Address | I/O Direction | Description | Circuit 52 Action |
|---|---|---|---|
| All DMA addresses (0x00 through 0xFF, 0x80 through 0x87) | Output | DMA Controller access registers | All accesses to these registers are snooped by the hardware and the values are placed into specific locations in the chip. |
| 0x226 | Output | Sound circuit Reset Register; write 0x01 to enable reset, 0x00 to clear the reset | Writes are stored to trace buffer; if data is 0x00, reset state machine; otherwise, do nothing. |
| 0x22A | Input | Sound circuit Read Data Register; location for returning data from sound circuit to application | When the state machine requires a value to be returned, the value is written into the Real Mode Register Store located in the frame buffer. When circuit 52 sees the I/O read bus signals for this register, it will place the value onto the bus in response. |
| 0x22C | Output | Sound circuit Write Data Register; location for sending data from application to sound circuit | Writes are stored to the trace buffer; state machine recovers values and acts accordingly. |
| 0x22C | Input | Sound circuit Write Buffer Status Register; top bit of register is used to notify application if the sound circuit Write Data Register (0x22C) is available for writing. | When circuit 52 sees the I/O read bus signals for this register, it will return a preset data value onto the bus. |
| 0x22E | Input | Sound circuit Read Buffer Status Register; top bit of register is used to notify application if the sound circuit Read Data Register contains data returned to the application. | When circuit 52 sees the I/O read bus signals for this register, it will place a value onto the bus in response. When circuit 52 sees the subsequent I/O read bus signals for 0x22A, the hardware will automatically clear a bit of this register located in the RealMode Register Store. |

Figure 3a

Sound Circuit State Operations

Data is passed from the trace buffer to the state machine for operation. The state machine will wait for any required additional data before processing the entire command. If required, the state machine may generate a return value, which will be passed back to the Real Mode Register Store (located in the frame buffer) in order to be placed back onto the I/O bus.

| I/O Address | I/O Data (required value + [additional data] + ...) | Action Summary | Return Value (0x22A) or Action |
|---|---|---|---|
| 0x226 | 0x00 | Reset sound circuit state machine and return 0xAA | 0xAA |
| | anything else | None | none |
| 0x22C | 0x10 + [data] | Write [data] immediately out the AudioOut channel | none |
| | 0x14 + [lobyte] + [hibyte] | Start single-block DMA AudioOut using the size given by [lobyte] and [hibyte] and the address taken from the DMA values stored in the hardware | Generate IRQ when finished, then stop |
| | 0x1C | Start continuous DMA AudioOut using the size already specified with command 0x48 and the address taken from the DMA values stored in the hardware | Generate IRQ when finished, then start over again |
| | 0x20 | Return a single byte pulled immediately from the AudioIn channel | [data] |
| | 0x24 + [lobyte] + [hibyte] | Start single-block DMA AudioIn using the size given by [lobyte] and [hibyte] and the address taken from the DMA values stored in the hardware | Generate IRQ when finished, then stop |
| | 0x2C | Start continuous DMA AudioIn using the size already specified with command 0x48 and the address taken from the DMA values stored in the hardware | Generate IRQ when finished, then start over again |

Figure 3b

| | | |
|---|---|---|
| 0x40 + [data] | Set the sampling rate based on [data] and given rate conversion equations | none |
| 0x48 + [lobyte] + [hibyte] | Set the buffer count used for continuous audio commands, given by [lobyte] and [hibyte] | none |
| 0x80 + [lobyte] + [hibyte] | Play a single block of AudiOut silence using the size given by [lobyte] and [hibyte] | none |
| 0x90 | Start continous DMA AudioOut using the size already specified with command 0x48 and the address taken from the DMA values located in the RealMode Register Store | Generate IRQ when finished, then start over again |
| 0x91 | Start single-block DMA AudioOut using the size already specified with command 0x48 and the address taken from the DMA values stored in the hardware | Generate IRQ when finished, then stop |
| 0x98 | Start continuous DMA AudioIn using the size already specified with command 0x48 and the address taken from the DMA values stored in the hardware | Generate IRQ when finished, then start over again |
| 0x99 | Start single-block DMA AudioIn using the size already specified with command 0x48 and the address taken from the DMA values stored in the hardware | Generate IRQ when finished, then stop |
| 0xD0 | Halt any DMA Audio operations currently in progress; will remain halted until state machine is reset or command 0xD4 is received | none |
| 0xD1 | Enable speaker | none |
| 0xD3 | Mute speaker | none |

Figure 3c

| | | | |
|---|---|---|---|
| | 0xD4 | Resume any currently halted DMA Audio operations | none |
| | 0xD8 | Get current speaker status (on or mute) | 0x00 if speaker mute<br>0xFF is speaker on |
| | 0xDA | Complete current continous DMA Audio operation, and then stop at end of current block | none |
| | 0xE0 + [data] | Perform read/write test; return given [data] inverted | ![data] |
| | 0xE1 | Return current two byte version of the sound circuit, most significant byte first | [hibyte] + [lobyte] |
| | 0xE2 + [data] | Return the encrypted value of the given [data], using the sound circuit encryption routine | encrpypt([data]) |
| | 0xE4 + [data] | Store the given [data]; will need to be returned in response to command 0xE8 | none |
| | 0xE8 | Return the [data] that was provied by a previous command 0xE4 | [data] |
| | 0xF2 | Generate a single interrupt | Generate IRQ |
| | anything else | none | none |

SYSTEM USING A PLURALITY OF STATE MACHINES FOR TRANSLATING COMMANDS INTENDED FOR LEGACY BUS DEVICES TO COMMANDS FOR LOCAL BUS DEVICES

BACKGROUND OF THE INVENTION

1. Field of the Invention

This invention relates to computer input/output circuitry, and more particularly, to methods and apparatus for emulating legacy hardware in an improved input/output system.

2. History of the Prior Art

The IBM personal computer as originally designed utilized an Intel 8088 microprocessor and provided very few input/output options. It was able to provide a monochrome output display with a limited number of sounds. As the computer became more powerful through the use of faster more powerful processors and more memory, a number of more advanced input/output devices were designed which greatly enhanced the use of the computer. For example, graphics output display circuitry was devised which was able to provide color output displays of 640 by 480 pixels with a number of selectable colors. Once this point in the development of the personal computer was reached, a very large number of useful application programs were written; and the IBM personal computer began to be used in many business applications.

Similarly, the original IBM personal computer was able to make a few sounds which were generally used to alert the user to changes in the operation. After some period, circuitry for providing FM synthesized sounds was incorporated and used to generate musical sounds. Since that time many application programs have utilized such sound circuitry to generate musical sequences. However, FM synthesis produces musical sounds of a generally inferior quality and cannot faithfully reproduce most sound effects so the continued use of the type of sound generation circuitry is somewhat limited.

Recently, circuitry such as the "Sound Blaster," marketed by Creative Labs, Incorporated, has been devised to provide more complete generation of sounds. This sound circuitry uses a basic form of digital sampling in which sounds produced by instruments or other means are digitally recorded and replayed. This form of sound circuitry has become a standard in the personal computer industry for basic sound generation circuitry, and a very significant number of application programs have been written which use this sound technique as a composite part of the program. A problem of this form of sound circuitry is that each sound which is to be reproduced by the sound circuit must be prerecorded as a part of the software associated with the circuitry.

More recently, advanced wave table sound circuits have enhanced the production of musical and other sounds. These circuits provide larger amounts of local storage for sounds which have been prerecorded and circuitry which is able to combine, modulate, and manipulate the prerecorded sounds in various manners in order to generate new sounds. The use of these circuits have been incorporated into newer application programs.

There are a very large number of application programs which utilize these different forms of sound circuitry in their presentations.

Although the circuits which provide these outputs are capable, they are certainly not the ultimate in input/output

2 devices. For example, typically each such circuit is independent of all of the other circuits and requires a separate space on the computer system bus. Compared to some more modern systems, each of these systems is relatively slow and limited in usefulness. Recently new forms of busing circuitry have been designed which greatly enhance the transfer of data in personal computer systems. However, this new busing circuitry also significantly changes the manner in which input/output devices cooperate with busing circuitry. For this reason, most prior art input/output devices which provide sound, graphics, and similar output cannot simply be provided new interfaces to the new buses and expected to function. Moreover, in many cases, the functionality of the older input/output devices does not increase by joining them to the newer buses so they are simply left on the older slower buses. In the mean time, newer input/output devices using the newer buses can be devised. However, because such a very large number of application programs utilize the older circuitry, some manner of producing the output expected from the older input/output circuits must be available for a more modern computer system to be able to run older application programs and thus to succeed economically. One way to accomplish this is to provide both old and new devices in the same computer.

Since this is economically wasteful, it is desirable to provide arrangements for emulating older input/output circuitry in computer systems so that legacy programs may be run on systems utilizing more modern input/output devices to provide better performance.

SUMMARY OF THE INVENTION

It is an object of the present invention to provide an arrangement for emulating input/output circuitry utilized in prior art personal computers.

It is another object of the present invention to provide local bus input/output apparatus and an improved method of emulating sound and graphics input/output devices previously used in computer systems having Industry Standards Association (ISA) busing arrangements.

These and other objects of the present invention are realized in an arrangement which includes circuitry for snooping on the bus to capture commands sent to input/output devices the functions of which are to be emulated, circuitry for storing those commands, circuitry for generating new commands in response to the commands which are stored, and circuitry for generating output signals in response to the new commands which output signals replace the output signals produced by the prior art devices in response to the stored commands.

These and other objects and features of the invention will be better understood by reference to the detailed description which follows taken together with the drawings in which like elements are referred to by like designations throughout the several views.

BRIEF DESCRIPTION OF TE DRAWINGS

FIGS. 3a–3d is a list of signals which can be emulated by a portion of the circuit of FIG. 2.

NOTATION AND NOCMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
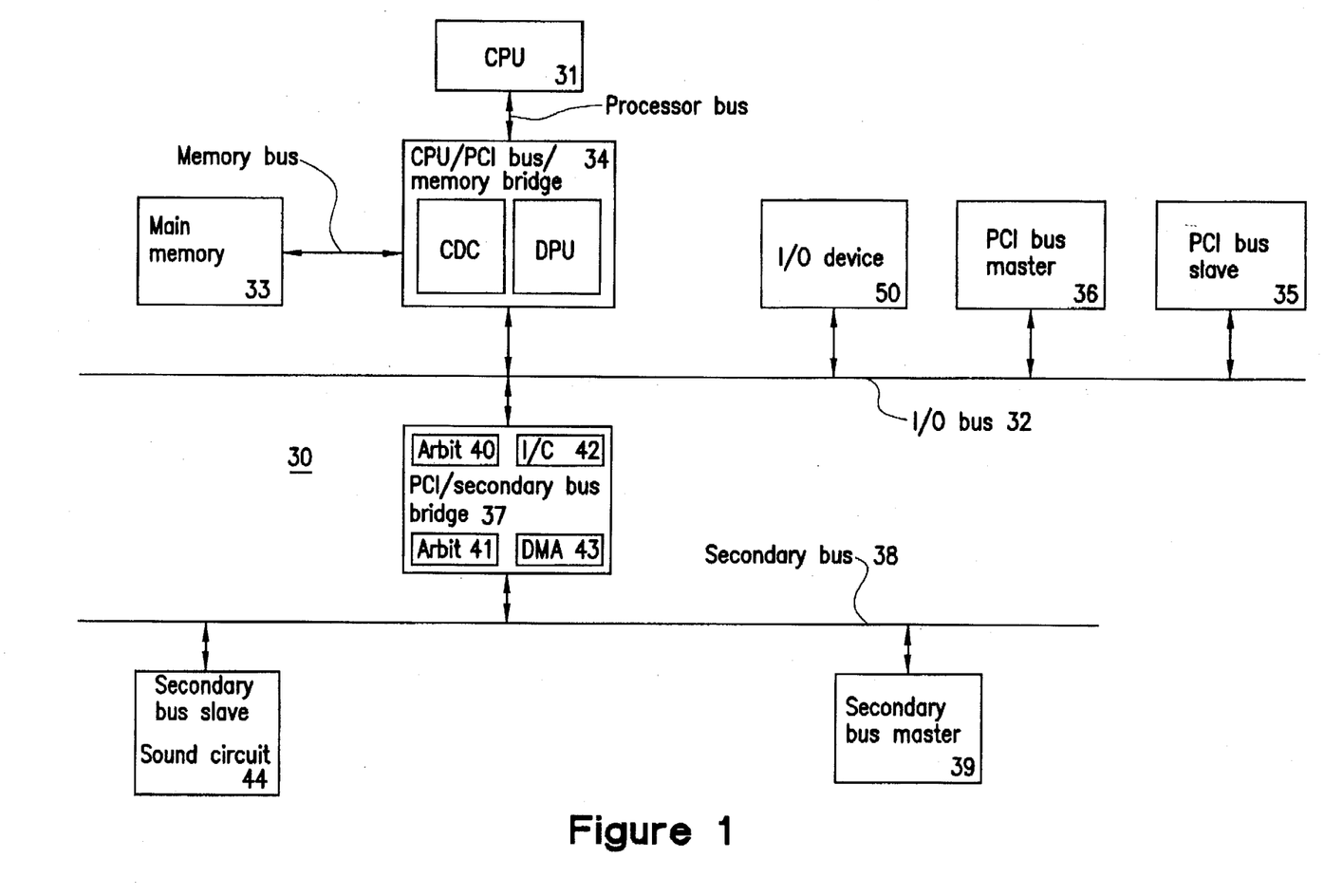
FIG. 1 is a block diagram of a (PCI) computer system which may utilize the present invention.

Referring now to FIG. 1, there is illustrated a system 30 which may utilize the present invention. The present invention is especially useful in a personal computer system such as that illustrated having a local bus architecture such as the personal computer interface (PCI) bus designed and manufactured by Intel Corporation or the VESA local bus. Such systems provide a wider bus, typically thirty-two or sixty-four bits, which is more closely associated with the central processing unit of the system and consequently is able to transfer data at a more rapid rate than previously utilized buses such as the Industry Standard Association (ISA) bus.

FIG. 1 illustrates a computer system 30 designed with a PCI bus architecture. The system 30 includes a central processor 31 such as an Intel i486 or Pentium™ microprocessor (each of which is manufactured by Intel Corporation of Santa Clara, Calif.) which carries out the various instructions provided to the computer 30 for its operations. The central processor 31 is joined to an input/output bus 32 adapted to carry information to various components of the system 30. In the exemplary system, the input/output bus 32 is designed as a PCI bus in order to allow the transfer of data to and from the central processor 31 at a rate faster than is possible utilizing the typical ISA or EISA buses used by the prior art. The processor 31 is joined to the bus 32 by a bridge circuit 34 which is adapted to provide various functions necessary to the transfer. Also joined to the PCI bus 32 by the bridge circuit 34 is main memory 33 which is typically constructed of dynamic random access memory arranged in a manner well known to those skilled in the prior art to store information during a period in which power is provided to the system 30. One particular bridge circuit 34 is physically constructed to include both a cache and dram controller (CDC) chip and a data path unit (DPU) chip each of which is manufactured by Intel Corporation of Santa Clara, Calif., although other bridge circuits designed in accordance with the PCI specification would function as well. Detailed descriptions of the Intel chips are provided in *Cache & DRAM Controller (CDC) 82424TX* and *Data Path Unit (DPU) 82423TX*, each published by Intel Corporation. In addition to various functions such as cache control and data synchronization, the bridge circuit 34 includes circuitry for controlling and accomplishing the transfer of data among the CPU 31, main memory 33, and the PCI bus 32.

The PCI bus 32 provides access to components associated therewith such as a PCI bus slave circuit 35 which may be a video output card which includes a frame buffer adapted to store video signals to be transferred to an output device such as a monitor for display. A PCI bus master circuit 36 may also be connected to the PCI bus 32. The main properties of a PCI bus master are that it includes a bus controller which functions at some internal clock rate and that it may initiate and control operations on the PCI bus 32.

Also connected to the PCI bus 32 is a PCI/secondary bus bridge circuit 37. The bridge circuit 37 performs the various functions necessary to transfer data between the PCI bus 32 and various component circuits joined to a secondary bus 38. The secondary bus 38 may be an ISA bus or a Expanded Industry Standard Association (EISA) bus either of which operates at a slower data transfer rate than the PCI bus 32. A specific PCI-to-ISA bus bridge circuit 37 is a part of an integrated circuit chip referred to as a "system input/output" (SIO) circuit manufactured by Intel Corporation; other bridge circuits designed in accordance with the PCI specification would function as well. Such a bridge is described in detail in a publication entitled *82420/82430 PCIset ISA and EISA Bridges*, published by Intel Corporation. Such a bridge circuit 37 includes circuitry for providing the interface between the PCI bus 32 and the secondary bus 38 which allows data to be transferred therebetween. The bridge circuit 37 provides circuitry which allows it to operate as an intercoupling bus master or as a bus slave on the PCI bus 32. The ability of the bridge circuit 37 to act as a PCI bus master allows a bus master circuit 39 positioned on the secondary bus 38 (for example, local area network circuitry) to gain access to the PCI bus 32 and thence to main memory. The SIO chip which includes the bridge circuit 37 also includes a first arbiter circuit 40 for controlling access to the PCI bus 32 and a second arbiter circuit 41 for controlling access to the secondary bus 38. The SIO chip also includes direct memory access (DMA) circuit 43 which is shared by all of the input/output devices on the secondary bus 38 and interrupt controller circuitry 42. It should be noted that the DMA circuit 43, even though positioned in the bridge circuit 37, is joined to the secondary bus 38 and is not available for use by devices on the PCI bus 32.

Prior art input/output devices such as sound boards and graphics output controllers have typically been designed as bus slaves on a bus which, like the secondary bus 38, may be an ISA bus. The circuit 30 of FIG. 1 may be used in order to review the operation of such devices. If, for example, a basic sound generation circuit 44 is positioned on the bus 38, an application program running on the central processing unit 31 may utilize the circuit 44 by first providing digital audio data to a position in main memory 33. The application program then sends the address and the length of some amount of the data in main memory to the DMA circuit 43 to indicate which data is to be transferred to the sound circuit 44. The application program then sends commands to cause the sound circuit 44 to play a particular passage using the data for which the DMA circuit 43 has the address and length. Included with these commands is the length of data to be played by the sound circuit. The sound circuit 44 causes the DMA circuit 43 to begin the transfer of the indicated data from main memory to the sound circuit 44. The data is transferred from main memory to the sound circuit, the sound circuit utilizes the data to generate the audio sounds commanded by the application program.

When the sound circuit is done processing the amount of data designated by the commands given by the application program to the sound circuit, the sound circuit sends a hardware interrupt back to the application program running on the central processing unit 31 to indicate that the operation has been completed. Presuming that additional sounds are to be played from the digital data stored in main memory, the application responds to the interrupt by restarting the process at a new data address in main memory.

In addition to simply playing the sounds in the manner described, many application programs make use of the ability of the ISA DMA circuitry to enter an auto-initialize mode to transfer very large amounts of data to the sound circuit. In this mode which is initiated by auto-initialize commands to both the DMA circuit 43 and the sound circuit 44 in addition to the other commands, the DMA circuit 43 transfers data from a prescribed area of memory; and, when the operation is complete, returns to the beginning address and starts transferring data beginning again at the initial address. An application program may use this facility to transfer large amounts of data by transferring new sound data to the area of main memory from which data has already been transferred while the DMA circuit 43 is still transferring data to the sound circuit 44. To facilitate this operation, many application programs continually poll the DMA circuit 43 in order to monitor the progress of the transfer of the digital data from main memory so that the application may know how much of the transfer has been completed. This is necessary since there is no interrupt to indicate the transfer status until all of the digital data requested by the sound circuit 44 has been transferred by the DMA circuit 43 to the sound circuit 44. Monitoring the DMA circuit 43 allows an application program to recognize addresses of main memory from which data has already been transferred and to put new data into those areas of memory. This new data is then transferred automatically as the auto-initialize mode causes the transfer of the data from the designated area to be sent repeatedly. This substantially increases the speed of the process since it may continue without new commands needing to be sent to the DMA circuit 43 or the sound circuit 44.

If it were possible to connect a sound card constructed in accordance with the teachings of the prior art in the position of the PCI slave circuit 35 illustrated in FIG. 1, such a sound card should be able to operate in the same manner as a sound output card positioned on the ISA bus. Unfortunately, a PCI bus slave card is limited in a number of ways so that it cannot make a great deal of use of the broader bandwidth of the PCI bus. First, a PCI sound card arranged as a bus slave would have to utilize the same architecture as sound cards positioned on the secondary ISA bus. This would offer no advantage over present sound cards positioned on the ISA bus. Moreover, since the DMA circuit 43 would not be available to transfer data to any sound card positioned on the PCI bus, there is no convenient way to provide data rapidly to such a sound circuit. Moreover, the legacy software is written to access the DMA circuit 43 directly.

For this reason, new sound circuits and other circuits specifically designed to utilize the advanced features of the more modern buses are being designed. However, because such a very large number of application programs utilize software produced for the older circuitry, some manner of reproducing the output expected from the older input/output circuits must be available for a more modern input/output device to succeed economically.

Presuming that an input/output device 50 is available on the PCI bus 32 which is capable of producing the output of older input/output devices (e.g., playing the digital sounds directed to the sound device 44 by an application program which requires at least basic sound capabilities), causing such a device 50 to function in response to existing application programs which are able to utilize the prior art input/output devices poses a number of significant problems. For example, in attempting to emulate the functions of the sound card 44, a number of general and particular problems arise. First, as has been pointed out, the DMA circuit 43 to which the DMA commands are addressed by the application program does not function with devices on the PCI bus 32. It can transfer data to and from devices on the secondary bus 38 only. Second, each of the PCI input/output devices has only one hardware interrupt. Typically, this suffices because most PCI input/output devices do not require many interrupts. However, a sound card such as that described makes such extensive use of interrupts that it requires almost a dedicated interrupt; there would be so much traffic using that interrupt that the card in that particular bus slot on the PCI bus could accomplish no other operations. Thus, if there are other functions which might be running concurrently on the card, this concurrency would be destroyed. Since it is desired to utilized the ability to reproduce sounds from old application programs in a more modern system, none of the modern systems operations could be utilized while the legacy sound functions were being used.

Another problem must be overcome if a circuit 50 is to be produced which is capable of operating to produce the sounds of legacy application programs at the same speed as they are produced by the more advanced of the basic sound circuits used in the prior art. It will be recalled that in order to increase the operational speed of sound circuits on the ISA bus, application programs utilize the auto-initialize mode of the DMA circuit 43 and monitor the transmission of data by the DMA circuit 43 so that they may transfer additional data to main memory to occupy the position of data which has already has been transferred by the DMA circuit. This can only be accomplished by monitoring the DMA circuit 43 which functions with devices on the ISA bus but does not function with PCI input/output devices. Consequently, this increase in operational speed appears not to be possible with devices on the PCI bus.

Figure 2:
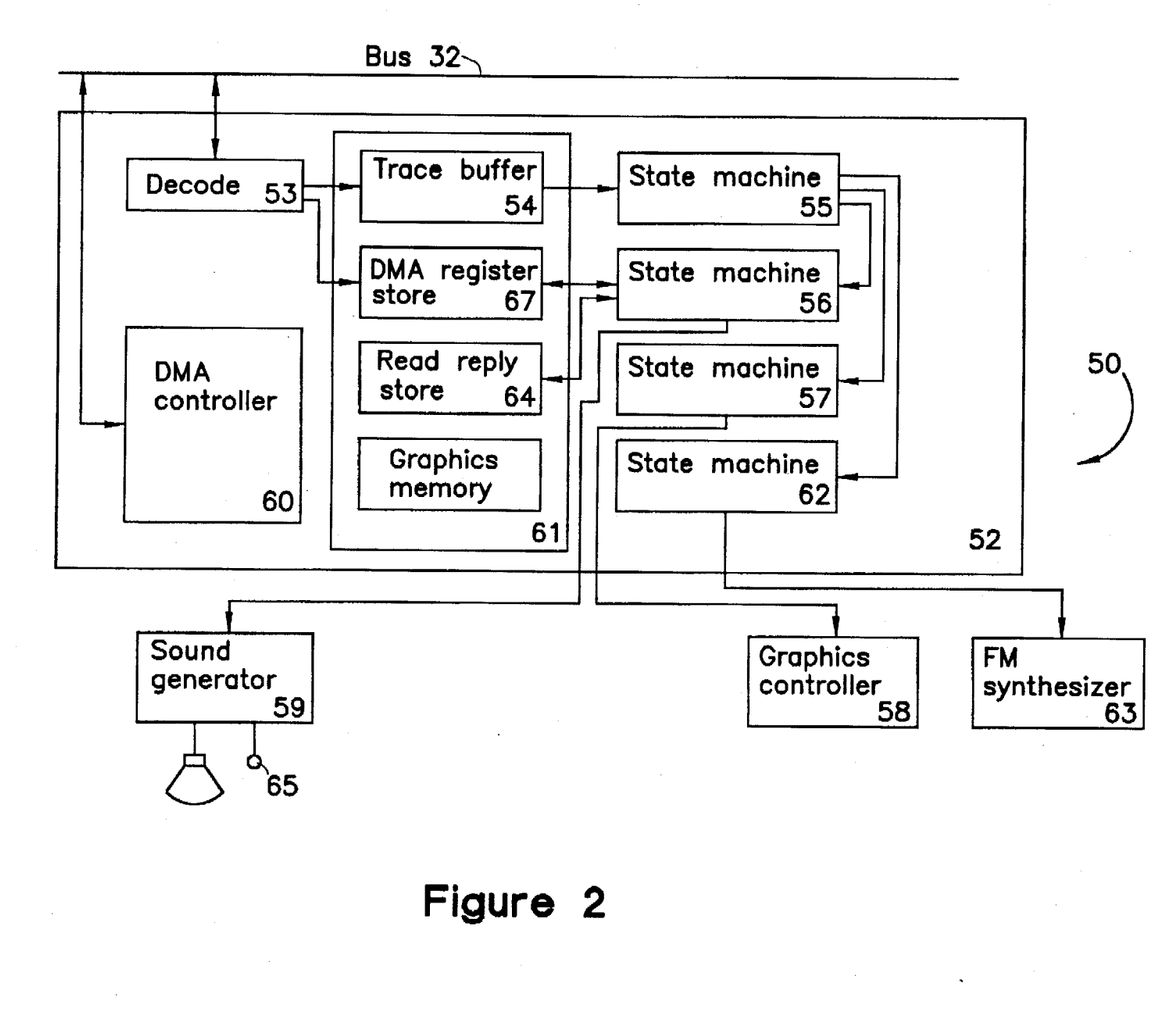
FIG. 2 is a block diagram illustrating an emulation system in accordance with the present invention.
Figure 3C:
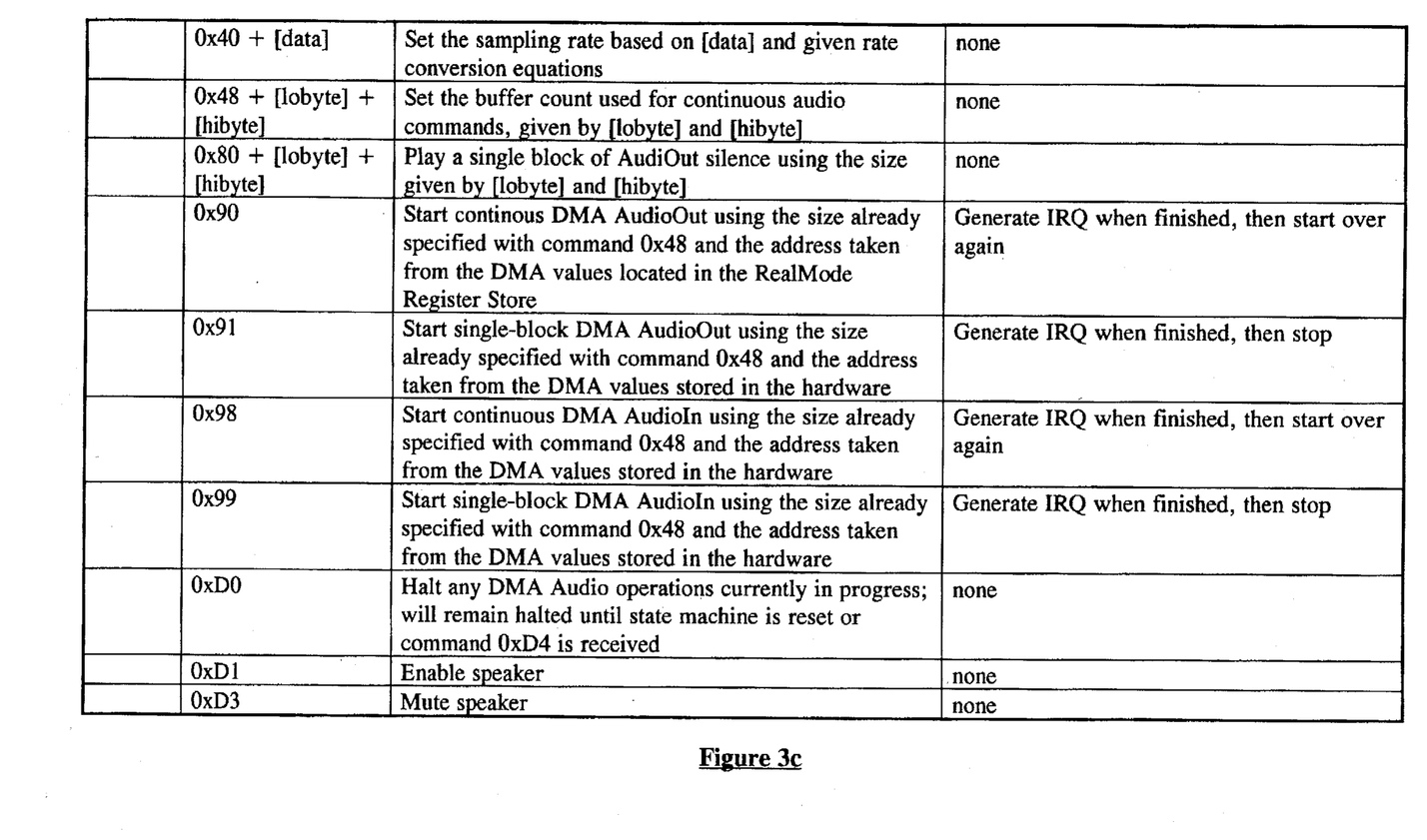
Figure 3D:
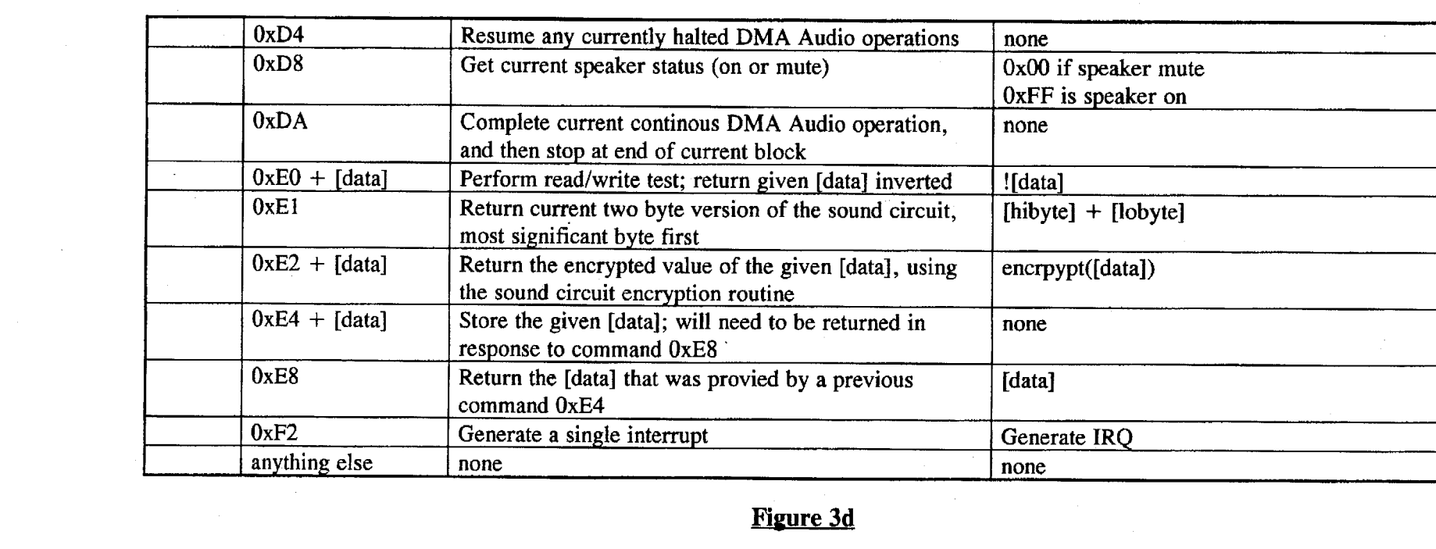

The present invention solves all of these problems and provides emulation of ISA sound circuits for bus master circuits running on the PCI bus 32. FIG. 2 is a block diagram of a circuit 50 designed in accordance with the present invention. The circuit 50 includes a logic analyzer 52 which snoops on the bus 32 for commands sent by the central processing unit 31 to the sound circuit 44. Commands which are transferred to the ISA bus 38 appear as bus cycles on the PCI bus 32 and may therefore be detected. The logic analyzer 52 takes commands which it detects, changes those commands to commands which may be understood by a modern sound circuit 59, and sends those interpreted commands to the modern sound circuit 59 to be played.

To accomplish these functions, the logic analyzer includes a decode circuit 53 which looks for addresses of commands decoded by the sound circuit 44. If the decode circuit 53 detects any bus cycles containing commands to these addresses, the commands are stored in a trace buffer memory 54 which may be a portion of local memory 61. The decode circuit 53 also looks for addresses on the bus 32 which are addresses of commands directed to the DMA circuit 43. If the decode circuit 53 detects any bus cycles containing commands to these addresses, the commands are stored in a portion of local memory 67 which is a part of the circuit 50.

For example, a command such as a write to a particular port which is an address of the sound circuit 44 and having a particular value will be stored in the trace buffer 54. A hardware interrupt is generated when a command is sent to the trace buffer 54. The hardware interrupt will be serviced by the interrupt controller circuit 42 and a hardware interrupt handler called to run on the processor. This hardware interrupt handler sends the command in the trace buffer 54 to a state machine 55. This state machine may be a hardware state machine; however, in one embodiment the state machine is a part of a program which runs on the central processing unit 31 in the manner of a terminate and stay resident program. In an embodiment of the invention, local memory 61 on the circuit 50 is utilized to provide storage for this state machine program and other state machines which may be provided in software. By utilizing local memory for this purpose, space in main memory need not be reduced by being allocated to running this operation as a terminate and stay resident program; this allows additional space for application programs. In order to allow local memory to be accessed by the central processing unit 12 to run this state machine program, a software driver for the circuit 50 may map a 32 Kbyte portion of main memory above the lower 640 Kbytes typically used for MDA video memory addresses directly to the circuit 50. A portion of this 32 Kbytes may then be used for the state machine software described in this specification.

Commands in the trace buffer memory 54 sent to the state machine 55 are compared with addresses of input/output devices for which emulation operations are being provided. For example, sound operations, FM synthesis operations, VGA graphics operations, as well as other operations, may all be emulated using the present invention. Presuming that the addresses are addresses decoded by the sound circuit 44, the command is sent to another state machine 56 which generates a response proper to the command directed to the sound circuit 44 in order to carry out the command initiated by the central processing unit 31. The response generated by the state machine 56 is sent to a sound generator circuit 59 capable of producing sounds normally produced by the sound circuit 44. Commands decoded by a VGA controller on the ISA bus would be sent to a state machine 57 which provides commands for operating a modern graphics controller 58. Similarly, commands decoded by an FM synthesizer on the ISA bus would be sent to a state machine 62 which provides commands to a circuit 63 for producing sounds from those commands. It should be noted that this may be the same circuit 59 as is utilized to produce sounds originally directed to the sound circuit 44. As with the state machine 55, the state machines 56, 57, and 62 may be hardware circuits or software. In one embodiment, each of the state machines 56, 57, and 62 is a software process called by the state machine 55.

Using the example of sound circuit emulation, there are approximately thirty commands which a typical sound circuit is capable of executing; consequently, the state machine 56 need not be especially complicated. The commands which the state machine 56 is able to process and the output signals produced in response to those commands are illustrated in FIGS. 3a–3d. The state machine 56 must respond to the command which the circuit 50 has detected in the time during which the sound circuit 44 would respond if such a circuit were, in fact, connected in the system. Therefore, the state machine 56 responds to the interrupt generated as the command is placed in the trace buffer and rapidly generates a signal to furnish a response on the bus 32. The particular signal generated by the state machine 56 can cause a number of things to occur. If the command is a write to the sound circuit, the command is simply stored in the trace buffer and then used in causing the sound generation circuit 59 to carry out the operation desired of the sound circuit 44. If the command is a read, the signal from the decode circuitry 53 causes one of a number of responses to reads stored in local memory 64 to be placed on the PCI bus 32. The circuit 50 can, thus, see everything that is being requested on the bus 32 and is able to place values stored in a local memory on the bus 32 to satisfy reads from the application program running on the central processing unit and requesting the sound operations. When a read occurs, the decode circuitry 53 acknowledges the read rapidly. It will be understood by those skilled in the art that this allows the operation of the sound circuit 44 in producing sounds to be emulated on the PCI bus 32.

However, since the sound circuit 44 obtains the digital data it uses to produce the sounds using the DMA circuit and the DMA circuit is unable to service requests on the PCI bus, a new DMA controller 60 is provided as a part of the circuit 50. A major problem arises at this point. The new DMA controller 60 needs to know where in memory the digital data is stored in order to transfer it to the sound generating circuit 59. Since this data is never sent to the sound circuit 44, the sound circuit 44 never knows where in memory the data is and simply snooping the commands directed to the sound circuit 44 does not solve this problem. When the application requests that fifty bytes of digital data be played, the command is sent to the sound circuit 44 to play; and the sound circuit 44 asks the DMA circuit to transfer the data to it. In spite of all the tracing, if only the commands to the sound circuit 44 were intercepted the circuit 50 would never know where in memory the data is stored.

However, since the logic analyzer 52 also detects the commands to the DMA circuit 43, the DMA controller 60 is able to respond to commands placed on the bus and directed to the DMA circuit 43. This is accomplished in a manner essentially identical to the manner in which the circuit 50 accomplishes the emulation of sounds and graphics. The commands to addresses decoded by the DMA circuit 43 are detected by the decode circuit 53 and sent to local memory 67. These commands are then used by the state machine 56 when it later decodes signals addressed to the sound circuit 44. When a sound operation is commanded, the state machine 56 generates signals which cause the commands designating the area of main memory from which data is to be transferred and the length of the data stored in local memory 67 to be furnished to the DMA controller 60 so that it may respond to commands from the sound generation circuit 59. Thus, the present invention allows the commands from an application program which would normally be utilized to operate a sound circuit 44 positioned on the bus 38 using data transfer operations by the DMA circuit 43 to be emulated by the sound generation circuit 59 using the DMA controller 60.

However, a number of problems must be overcome in order to accomplish these operations. It will be recalled that many applications continuously poll the DMA circuit 43 in order to determine the status of the transfer of data to the sound circuit 44. The application programs use this knowledge to transfer new digital data to areas of main memory from which digital data has already been transferred in order that the transfer operations may be carried out as promptly as possible. However, the DMA circuit 43 is not actually transferring data to a sound circuit 44 so the status of the DMA circuit 43 is not available as a output signal. Therefore, the application program must wait until the transfer is complete and a hardware interrupt is generated to know the transfer status.

It has been found that the DMA circuit 43 responds to a command which places it in a diagnostic mode referred to as a verify mode. In this diagnostic mode, all reads and writes sent to the DMA circuit 43 as normal commands are cut off internally within the DMA circuit 43 so that the controller does not respond to an application program. However, the verify mode allows writing values for test purposes to the DMA circuit 43 to change its register values. This allows the count value and the address from which the DMA circuit 43 appears to be transferring data to be varied. These values may be read by an application program. As the DMA controller 60 is transferring data from main memory, the state machine program running on the central processing unit may place the DMA circuit 43 in verify mode, detect the status of the addresses and count value in the registers of the DMA controller 60, and then write these addresses and byte count values to the DMA circuit registers in order to lower the value of the count. When an application program reads the DMA circuit values and sees the address and the bytes count values changing, the application program knows how far the transfer process has progressed and has the addresses available to store new data in main memory.

It is also necessary to send a hardware interrupt back to the central processing unit once a DMA transfer is complete so that the application program knows the process of DMA transfer is complete. Although there is no way to generate a hardware interrupt from the circuit 50 in a PCI slot and still utilize the circuit 50 for other purposes, the state machine program generates a software interrupt which has the same characteristics as the expected hardware interrupt. However, at the end of any hardware interrupt routine such as the routine run by an application program in response to an interrupt generated by the sound circuit 44, an end of interrupt signal (EOI) is usually sent to the interrupt controller so that the interrupt controller may clear the status bit for the hardware utilizing the interrupt controller thereby allowing interrupts of lower priority devices to be processed. However, the EOI signal generated by the sound circuit hardware interrupt routine is really responding to a software rather than a hardware interrupt. Consequently, such an EOI signal can cause a clear of the status bit for hardware actually not involved in the operation which is ending; such an EOI signal can cause the circuit 50 to lose control of the central processing unit thereby interrupting the software state machine program.

In order to obviate this problem, the present invention utilizes a special diagnostic mode of the interrupt controller. By placing the interrupt controller in this special diagnostic (mask) mode, the interrupt controller may be made to ignore an EOI signal from the sound circuit. The present invention places the interrupt controller in the special mode and then generates a software interrupt which calls the hardware interrupt handler for the sound circuit. When the interrupt handler ends and an EOI signal is generated, the interrupt controller in the mask mode ignores the EOI. This allows the hardware which is expecting to reacquire control of the central processing unit 31 to do so without the problem of its status bit being cleared. Typically, this is the circuit 50 which is processing the audio signals which would normally run on the sound circuit 44.

In one embodiment, the software application running on the central processing unit to provide the state machine 55 operates in the following manner to carry out the emulation of functions performed on the secondary bus. Again, sound generation is used as an example. When power is applied to the system, the presence of a sound circuit 44 is detected. If no sound circuit 44 is present, the decoder circuit 53 is turned on and the state machine program is enabled. The program which operates the state machine 55 is stored in the local memory of the circuit 50 and is called whenever the trace interrupt is generated by a command to the sound circuit 44 or the DMA circuit 43. The trace interrupt is a hardware interrupt of the circuit 50 on the PCI bus 32. The state machine 55 looks at the command in the trace buffer (which is also stored in local memory) and transfers that command to one of a number of different state machines which are used to emulate different input/output devices on the secondary bus 38. More particularly, the state machine 55 may provide commands to one state machine 57 which generates signals used to operate a graphics controller 58 to produce signals for an output display in response to signals used by legacy software to generate a VGA output display. The state machine 55 may provide commands to another state machine 62 which generates signals used to operate a FM synthesis sound controller 63 to produce signals for producing musical output signals in response to signals used by legacy software to generate such musical signals. The state machine 55 may also provide commands to another state machine 56 which generates signals used to play sound signals typically played by a sound circuit such as a "Sound Blaster" circuit positioned on the secondary bus using a DMA circuit in order to transfer data from main memory.

Thus the state machine 55 reviews the addresses of the commands detected on the bus 32 and sends those commands to the appropriate one of the individual state machines 56, 57, or 62 for emulating the appropriate operation. In the case of the sound signals for which an example has been given, the state machine 55 transfers the commands to the state machine 56 capable of producing signals for emulating sound operations using the facilities of a DMA. This state machine 56 may be either a hardware or a software state machine. Its purpose is to produce each of the necessary signals to cause the DMA controller 60 to transfer the digital sound signals to the sound circuit 59 and the sound circuit 59 to generate the same sounds as those commanded of the sound circuit 44.

In order to accomplish this, the state machine responds to the commands controlling the sound circuit 44 to play the passages described by the digital data to be transferred by the DMA circuit 43 to retrieve the beginning position of digital data in memory and the length of the data to be transferred from the local memory 67. The state machine then generates commands causing the beginning position of digital data in memory and the length of the data to be transferred to the DMA controller 60. The state machine 56 then continues to respond to the commands by generating commands to the sound circuit 59 which cause the sound circuit 59 to play the appropriate sound passages.

In order to allow the circuitry of the present invention to operate in the auto-initialize mode as rapidly as the circuit 44 by sending signals to the application program requesting the sound signals indicating the status of the DMA transfer, the present invention breaks the DMA transfer operations into shorter segments. In the preferred embodiment, these segments are 128 bytes each. At the end of each 128 byte segment, the sound circuit 59 causes a hardware interrupt to be generated. When this interrupt is generated, the hardware interrupt handler calls the sound state machine 56 which places the DMA circuit 43 in the special test mode and sends signals to update its internal registers so that the application program may read the values indicating the address in memory and the count of data still to be transferred. The sound state machine 56 also provides the next set of addressing information to the DMA controller 60 and causes the sound circuit 59 to run the next increment of the sounds. When all of the sequence commanded by the application program has been completed, the sound state machine 56 sends signals to place the ISA interrupt controller into the special mask mode and generates the software interrupt signaling the end of the operation. This interrupt usually causes a hardware interrupt handler of the application program to generate a EOI signal which is ignored in the mask mode; and the circuit 50 maintains control of the central processing unit 31.

Thus, as may be seen from the description provided for the sound emulation, the present invention is able to emulate sound which would normally be provided by a sound circuit on the secondary bus 38. In a similar manner, the present invention is able to emulate VGA graphics operations and FM synthesized sound signals. It will be understood that the sound generator circuit 59, the DMA controller 60, and the software of the present invention also function to record sounds utilizing the arrangement described. To accomplish this, the logic analyzer 52 intercepts commands to the DMA circuit 43 related to the position in memory in which digital sound data which is to be recorded is to be stored and uses these commands in the manner described to program the DMA controller 60 to transfer data to main memory. The logic analyzer 52 intercepts commands to the sound circuit 44 intended to cause the sound circuit 44 to receive analog sounds at an external port, to convert those sounds to digital representations using an internal analog to digital converter, and to cause the DMA circuit 43 to transfer the converted digital data to storage in main memory for use by the application program. The logic analyzer 52 stores the commands to the sound circuit 44 in the trace buffer 54, generates an interrupt to the state machine 55, calls the state machine 56 to convert the commands to commands for the sound generator circuit 59. The sound generator 59 uses the commands to receive analog sounds at an external port 65, to convert those sounds to digital representations using an internal analog to digital converter, and to cause the DMA controller 60 to transfer the converted digital data to storage in main memory for use by the application program. Thus, the invention provides for emulating the processes of both recording and playing the sounds commanded by an application program which intends to control the operation of a sound circuit 44.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. Apparatus utilizing input/output devices on a local bus which input/output devices are unable to utilize legacy bus DMA devices for data transfer to emulate input/output operations which are intended for legacy devices on a legacy bus in a computer system comprising:

an input/output device adapted to be joined to a local bus, means for detecting commands addressed to an input/output device and to a DMA device both of which are adapted to be joined to a legacy bus, means for translating detected commands to an input/output device which is adapted to be joined to a legacy bus to commands for operating the input/output device adapted to be joined to a local bus, wherein the means for translating detected commands comprises means for storing detected commands, and state machine means for translating stored commands to commands for operating the input/output device adapted to be joined to a local bus, wherein the state machine means comprises a first state machine for transferring commands, and a plurality of state machine each adapted to translate commands stored for a particular input/output device which is adapted to be joined to a legacy bus, and DMA means for transferring data to input/output devices on a local bus.

2. Apparatus as claimed in claim 1 in which the means for detecting commands addressed to an input/output device which is adapted to be joined to a legacy bus comprises a circuit decoding addresses of commands to an input/output device which is adapted to be joined to a legacy bus.

3. Apparatus as claimed in claim 1 in which one of the plurality of state machines is adapted to translate commands for an FM synthesis sound circuit.

4. Apparatus as claimed in claim 1 in which one of the plurality of state machines is adapted to translate commands for a graphics control circuit.

5. Apparatus as claimed in claim 1 in which one of the plurality of state machines is adapted to translate commands for a basic ISA sound circuit.

6. Apparatus as claimed in claim 1 in which one of the plurality of state machines is adapted to translate commands for a wave table sound circuit.

7. Apparatus as claimed in claim 1 in which the means storing detected commands comprises memory means storing commands directed to a basic ISA sound circuit, and means storing commands directed to an ISA DMA circuit;

in which the state machine means for translating stored commands to commands for operating the input/output device adapted to be joined to a local bus comprises means for translating basic ISA sound commands to commands for operating an advanced sound circuit adapted to be joined to a local bus.

8. Apparatus as claimed in claim 7 in which the means storing detected commands further comprises memory means storing commands directed to an ISA DMA circuit;

and in which the DMA means for transferring data to input/output devices on a local bus transfers data under control of commands provided by the state machine means in response to commands stored by the memory means storing commands directed to an ISA DMA circuit.

9. Apparatus as claimed in claim 8 in which the state machine means for translating stored commands to commands for operating the input/output device adapted to be joined to a local bus comprises means for controlling an address and a count of data provided by an ISA DMA controller in response to commands directed to the ISA DMA circuit.

10. Apparatus as claimed in claim 7 in which the state machine means for translating stored commands to commands for operating the input/output device adapted to be joined to a local bus comprises means for disabling the function of a system interrupt controller for providing a hardware end of interrupt (EOI) signal.

11. A method of utilizing input/output devices on a local bus which input/output devices are unable to utilize legacy bus DMA devices for data transfer to emulate input/output operations which are intended for devices on a legacy bus in a computer system comprising the steps of:

detecting commands addressed to an input/output device and to a DMA device both of which are adapted to be joined to a legacy bus,     translating detected commands to an input/output device which is adapted to be joined to a legacy bus to commands for operating the input/output device adapted to be joined to a local bus, wherein the step of translating detected commands comprises the step of storing detected commands, and translating stored commands to commands for operating the input/output device adapted to be joined to a local bus, wherein the step of translating stored commands comprises the steps of utilizing a first state machine for transferring commands, and a plurality of state machine each adapted to translate commands stored for a particular input/output device which is adapted to be joined to a legacy bus,     utilizing DMA means for transferring data to input/output devices on a local bus, and     operating the input/output devices on a local bus to emulate input/output operations which are commanded by the detected commands.

12. A method as claimed in claim 11 in which the step of detecting commands addressed to an input/output device which is adapted to be joined to a legacy bus comprises decoding addresses of commands to an input/output device which is adapted to be joined to a legacy bus.

13. A method as claimed in claim 11 in which the step of translating stored commands to commands for operating the input/output device adapted to be joined to a local bus comprises the step of translating commands for an FM synthesis sound circuit.

14. A method as claimed in claim 11 in which the step of translating stored commands to commands for operating the input/output device adapted to be joined to a local bus comprises the step of translating commands for a wave table sound circuit.

15. A method as claimed in claim 11 in which the step of translating stored commands to commands for operating the input/output device adapted to be joined to a local bus comprises the step of translating commands for a basic ISA sound circuit.

16. A method as claimed in claim 11 in which the step of translating stored commands to commands for operating the input/output device adapted to be joined to a local bus comprises the step of translating commands for a graphics control circuit.

* * * * *